United States Patent
Hirabe

(10) Patent No.: US 8,588,828 B2
(45) Date of Patent: *Nov. 19, 2013

(54) MOBILE COMMUNICATION SYSTEM, BASE STATION AND INTERFERENCE CANCELLATION METHOD

(75) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 13/003,846

(22) PCT Filed: Jul. 31, 2009

(86) PCT No.: PCT/JP2009/063655
§ 371 (c)(1),
(2), (4) Date: Jan. 12, 2011

(87) PCT Pub. No.: WO2010/029818
PCT Pub. Date: Mar. 18, 2010

(65) Prior Publication Data
US 2011/0151908 A1 Jun. 23, 2011

(30) Foreign Application Priority Data
Sep. 11, 2008 (JP) ................................. 2008-233344

(51) Int. Cl.
*H04B 15/00* (2006.01)
*H04B 1/06* (2006.01)
*H03D 5/00* (2006.01)

(52) U.S. Cl.
USPC ........................... 455/501; 375/144; 375/346

(58) Field of Classification Search
USPC ........................................ 455/562.1, 63.4, 65
See application file for complete search history.

(56) References Cited

U.S. PATENT DOCUMENTS 5,966,095 A * 10/1999 Hiramatsu et al. ............. 342/383
6,069,912 A *  5/2000 Sawahashi et al. ............ 375/142
6,577,686 B1 *  6/2003 Koga et al. .................... 375/347

(Continued)

FOREIGN PATENT DOCUMENTS

JP       6-204902 A      7/1994
JP       7-84042 A       3/1995

(Continued)

OTHER PUBLICATIONS

Japanese Office Action for JP2008-233344 dated Feb. 2, 2011.

(Continued)

*Primary Examiner* — Nay A Maung
*Assistant Examiner* — Maryam Soltanzadeh

(57) ABSTRACT

The base station includes: a first combiner which weights the BB signals received by first and second antenna elements by first and second weight coefficients and adds them; a second combiner which weights the BB signals received by third and fourth antenna elements by first and second weight coefficients and adds them; a third combiner which weights the BB signals added by the first and second combiners by third and fourth weight coefficients and adds them; a first processor which calculates such first and second weight coefficients that a combined polarization of the received signals of each antenna is orthogonal to a polarization of an interfering signal existing in the same direction as a desired signal; and a second processor which calculates such third and fourth coefficients that a null is formed in a direction different from the desired signal and in which an interfering signal exists.

10 Claims, 4 Drawing Sheets

(56) References Cited

U.S. PATENT DOCUMENTS

| | | | |
|---|---|---|---|
| 7,010,023 B1* | 3/2006 | Sato | 375/150 |
| 7,265,714 B2* | 9/2007 | Goldberg | 342/378 |
| 2007/0117513 A1* | 5/2007 | Kasami et al. | 455/63.4 |

FOREIGN PATENT DOCUMENTS

| | | |
|---|---|---|
| JP | 9-153721 A | 6/1997 |
| JP | 2000266837 A | 9/2000 |
| JP | 2002026787 A | 1/2002 |
| JP | 2002359588 A | 12/2002 |
| TW | 510132 | 11/2002 |
| TW | 200640202 | 11/2006 |

OTHER PUBLICATIONS

International Search Report for PCT/JP2009/063655 mailed Oct. 13, 2009.

Taiwanese Office Action for TW098129027 mailed on Oct. 26, 2012.

* cited by examiner

# US 8,588,828 B2

MOBILE COMMUNICATION SYSTEM, BASE STATION AND INTERFERENCE CANCELLATION METHOD

This application is the National Phase of PCT/JP2009/063655, filed Jul. 31, 2009, which claims the priority based on Japanese Patent Application No. 2008-233344 filed on Sep. 11, 2008, the disclosure of which is hereby incorporated in its entirety.

TECHNICAL FIELD

The present invention relates to a mobile communication system, a base station and an interference cancellation method.

BACKGROUND ART

In a mobile communication system, it is possible for multiple mobile terminals to perform radio communication with a base station using the same frequency.

When the base station performs radio communication with a certain mobile terminal, the quality of reception deteriorates if a received signal (desired signal) which is received from the mobile terminal is interfered with by a received signal (interfering signal) which is received from another mobile terminal.

As an example of an interference cancellation technique for canceling such an interfering signal, there is a technique in which an antenna is constituted by multiple antenna elements, and the received signals of the antenna elements are antenna-combined to control the directivity of the antenna (see Patent Literature 1). According to this, it is possible to cancel an interfering signal by controlling the directivity of the antenna so that a null is formed in the direction of the interfering signal.

CITATION LIST

Patent Literature

Patent Literature 1: JP6-204902A

SUMMARY OF INVENTION

Technical Problem

In the interference cancellation technique described above, however, there is a problem that, in the case where an interfering signal exists in the same direction as a desired signal, the interfering signal cannot be cancelled because it is not possible to form a null in the direction of the interfering signal.

Thus, the object of the present invention is to provide a mobile communication system, a base station and an interference cancellation method for solving the problem described above.

Solution to Problem

A first mobile communication system of the present invention is:

a mobile communication system configured to comprise a mobile terminal and a base station which performs radio communication with the mobile terminal, wherein the base station comprises:

a first antenna including a first antenna element having a first polarization characteristic and a second antenna element having a second polarization characteristic orthogonal to the first polarization characteristic;

a second antenna including a third antenna element having the first polarization characteristic and a fourth antenna element having the second polarization characteristic;

first to fourth baseband signal converters which convert received signals received by the first to fourth antenna elements to baseband signals, respectively;

a first antenna combining unit which weights the baseband signals converted by the first and second baseband signal converters by multiplying the baseband signals by first and second weight coefficients, respectively, and adds the weighted baseband signals to one another;

a second antenna combining unit which weights the baseband signals converted by the third and fourth baseband signal converters by multiplying the baseband signals by the first and second weight coefficients, respectively, and adds the weighted baseband signals to one another;

a third antenna combining unit which weights the baseband signals added by the first and second antenna combining units by multiplying the baseband signals by third and fourth weight coefficients, respectively, adds the weighted baseband signals to one another and outputs the result;

a first signal processor which calculates, as the first and second weight coefficients, such first and second weight coefficients that the combined polarization of the received signals received by the antenna elements in the first and second antennas, respectively, are orthogonal to a polarization of an interfering signal existing in the same direction as a desired signal, by MMSE (Minimum Mean Square Error); and a second signal processor which calculates, as the third and fourth weight coefficients, such third and fourth weight coefficients that a null is formed in a direction different from the direction of the desired signal in directivity patterns of the first and second antennas and in which an interfering signal exists, by MMSE.

A second mobile communication system of the present invention is:

a mobile communication system configured to comprise a mobile terminal and a base station which performs radio communication with the mobile terminal, wherein the base station comprises:

a first antenna including a first antenna element having a first polarization characteristic and a second antenna element having a second polarization characteristic orthogonal to the first polarization characteristic;

a second antenna including a third antenna element having the first polarization characteristic and a fourth antenna element having the second polarization characteristic;

first to fourth baseband signal converters which convert received signals received by the first to fourth antenna elements to baseband signals, respectively;

a first antenna combining unit which weights the baseband signals converted by the first and third baseband signal converters by multiplying the baseband signals by first and second weight coefficients, respectively, and adds the weighted baseband signals to one another;

a second antenna combining unit which weights the baseband signals converted by the second and fourth baseband signal converters by multiplying the baseband signals by the first and second weight coefficients, respectively, and adds the weighted baseband signals to one another;

a third antenna combining unit which weights the baseband signals added by the first and second antenna combining units by multiplying the baseband signals by third and fourth weight coefficients, respectively, adds the weighted baseband signals to one another and outputs the result;

a first signal processor which calculates, as the first and second weight coefficients, such first and second weight coefficients that a null is formed in a direction which is different from the direction of a desired signal in directivity patterns of the first and second antennas and in which an interfering signal exists, by MMSE; and a second signal processor which calculates, as the third and fourth weight coefficients, such third and fourth weight coefficients that the combined polarization of the received signals received by the antenna elements in the first and second antennas, respectively, are orthogonal to a polarization of an interfering signal existing in the same direction as the desired signal, by MMSE.

A first base station of the present invention is:

a base station which performs radio communication with a mobile terminal, comprising:

a first antenna including a first antenna element having a first polarization characteristic and a second antenna element having a second polarization characteristic orthogonal to the first polarization characteristic;

a second antenna including a third antenna element having the first polarization characteristic and a fourth antenna element having the second polarization characteristic;

first to fourth baseband signal converters which convert received signals received by the first to fourth antenna elements to baseband signals, respectively;

a first antenna combining unit which weights the baseband signals converted by the first and second baseband signal converters by multiplying the baseband signals by first and second weight coefficients, respectively, and adds the weighted baseband signals to one another;

a second antenna combining unit which weights the baseband signals converted by the third and fourth baseband signal converters by multiplying the baseband signals by the first and second weight coefficients, respectively, and adds the weighted baseband signals to one another;

a third antenna combining unit which weights the baseband signals added by the first and second antenna combining units by multiplying the baseband signals by third and fourth weight coefficients, respectively, adds the weighted baseband signals to one another and outputs the result;

a first signal processor which calculates, as the first and second weight coefficients, such first and second weight coefficients that the combined polarization of the received signals received by the antenna elements in the first and second antennas, respectively, are orthogonal to a polarization of an interfering signal existing in the same direction as a desired signal, by MMSE; and a second signal processor which calculates, as the third and fourth weight coefficients, such third and fourth weight coefficients that a null is formed in a direction different from the direction of the desired signal in directivity patterns of the first and second antennas and in which an interfering signal exists, by MMSE.

A second base station of the present invention is:

a base station which performs radio communication with a mobile terminal, comprising:

a first antenna including a first antenna element having a first polarization characteristic and a second antenna element having a second polarization characteristic orthogonal to the first polarization characteristic, a second antenna including a third antenna element having the first polarization characteristic and a fourth antenna element having the second polarization characteristic;

first to fourth baseband signal converters which convert received signals received by the first to fourth antenna elements to baseband signals, respectively;

a first antenna combining unit which weights the baseband signals converted by the first and third baseband signal converters by multiplying the baseband signals by first and second weight coefficients, respectively, and adds the weighted baseband signals to one another;

a second antenna combining unit which weights the baseband signals converted by the second and fourth baseband signal converters by multiplying the baseband signals by the first and second weight coefficients, respectively, and adds the weighted baseband signals to one another;

a third antenna combining unit which weights the baseband signals added by the first and second antenna combining units by multiplying the baseband signals by third and fourth weight coefficients, respectively, adds the weighted baseband signals to one another and outputs the result;

a first signal processor which calculates, as the first and second weight coefficients, such first and second weight coefficients that a null is formed in a direction which is different from the direction of a desired signal in directivity patterns of the first and second antennas and in which an interfering signal exists, by MMSE; and a second signal processor which calculates, as the third and fourth weight coefficients, such third and fourth weight coefficients that the combined polarization of the received signals received by the antenna elements in the first and second antennas, respectively, are orthogonal to a polarization of an interfering signal existing in the same direction as the desired signal, by MMSE.

A first interference cancellation method of the present invention is:

an interference cancellation method performed by a base station which performs radio communication with a mobile terminal, the method comprising:

first and second conversion steps of converting received signals received by first and second antenna elements of a first antenna to baseband signals, respectively, the first antenna element having a first polarization characteristic and the second antenna element having a second polarization characteristic orthogonal to the first polarization characteristic;

third and fourth conversion steps of converting received signals received by third and fourth antenna elements of a second antenna to baseband signals, respectively, the third antenna element having the first polarization characteristic and the fourth antenna element having the second polarization characteristic;

a first antenna combining step of weighting the baseband signals converted at the first and second conversion steps by multiplying the baseband signals by first and second weight coefficients, respectively, and adding the weighted baseband signals to one another;

a second antenna combining step of weighting the baseband signals converted at the third and fourth conversion steps by multiplying the baseband signals by the first and second weight coefficients, respectively, and adding the weighted baseband signals to one another;

a third antenna combining step of weighting the baseband signals added at the first and second antenna combining steps by multiplying the baseband signals by third and fourth weight coefficients, respectively, adding the weighted baseband signals to one another and outputting the result;

a first calculation step of calculating, as the first and second weight coefficients, such first and second weight coefficients that the combined polarization of the received signals received by the antenna elements in the first and second antennas, respectively, are orthogonal to a polarization of an interfering signal existing in the same direction as a desired signal, by MMSE; and a second calculation step of calculating, as the third and fourth weight coefficients, such third and fourth weight coefficients that a null is formed in a direction different from the direction of the desired signal in directivity patterns of the first and second antennas and in which an interfering signal exists, by MMSE.

A second interference cancellation method of the present invention is:

an interference cancellation method performed by a base station which performs radio communication with a mobile terminal, the method comprising:

first and second conversion steps of converting received signals received by first and second antenna elements of a first antenna to baseband signals, respectively, the first antenna element having a first polarization characteristic and the second antenna element having a second polarization characteristic orthogonal to the first polarization characteristic;

third and fourth conversion steps of converting received signals received by third and fourth antenna elements of a second antenna to baseband signals, respectively, the third antenna element having the first polarization characteristic and the fourth antenna element having the second polarization characteristic:

a first antenna combining step of weighting the baseband signals converted at the first and third conversion steps by multiplying the baseband signals by first and second weight coefficients, respectively, and adding the weighted baseband signals to one another;

a second antenna combining step of weighting the baseband signals converted at the second and fourth conversion steps by multiplying the baseband signals by the first and second weight coefficients, respectively, and adding the weighted baseband signals to one another;

a third antenna combining step of weighting the baseband signals added at the first and second antenna combining steps by multiplying the baseband signals by third and fourth weight coefficients, respectively, adding the weighted baseband signals to one another and outputting the result;

a first calculation step of calculating, as the first and second weight coefficients, such first and second weight coefficients that a null is formed in a direction which is different from the direction of a desired signal in directivity patterns of the first and second antennas and in which an interfering signal exists, by MMSE; and a second calculation step of calculating, as the third and fourth weight coefficients, such third and fourth weight coefficients that the combined polarization of the received signals received by the antenna elements in the first and second antennas, respectively, are orthogonal to a polarization of an interfering signal existing in the same direction as the desired signal, by MMSE.

Advantageous Effects of Invention

According to the present invention, a base station causes a combined polarization with received signals of antenna elements in first and second antennas to be orthogonal to a polarization of an interfering signal existing in the same direction as a desired signal, and furthermore controls the directivity of the first and second antennas so that a null is formed in a direction which is different from the direction of the desired signal and in which the interfering signal exists, by MMSE.

Therefore, the following advantage can be obtained. As for an interfering signal existing in the same direction as a desired signal, the base station can cancel it by causing its polarization to be orthogonal to a combined polarization so that it cannot be received. At the same time, as for an interfering signal existing in a direction different from the direction of the desired signal, the base station can cancel it by forming a null in that direction.

DESCRIPTION OF EMBODIMENTS

DESCRIPTION OF EMBODIMENTS

The best mode for carrying out the present invention will be described below with reference to drawings.

First Exemplary Embodiment

Figure 1:
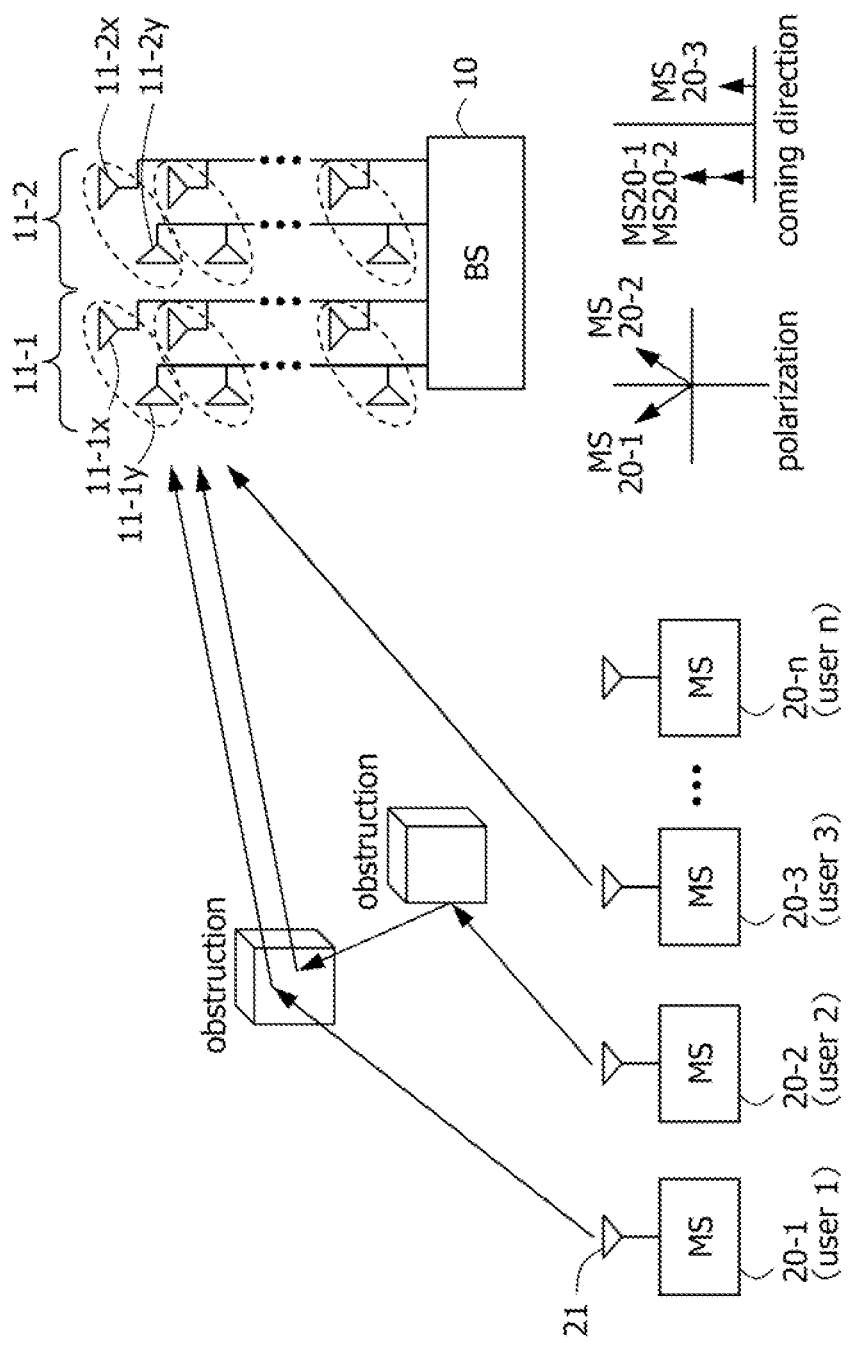
FIG. 1 is a diagram showing the configuration of a mobile communication system of first and second exemplary embodiments.

FIG. 1 is a diagram showing the whole configuration of a mobile communication system of this exemplary embodiment.

As shown in FIG. 1, the mobile communication system of this exemplary embodiment has base station (BS) 10 and n (n is 2 or a natural number more than 2) mobile terminals (MS: Mobile Station) 20-1~20-n.

Base station 10 is provided with antennas 11-1 and 11-2 which are orthogonal polarized antennas.

Here, antenna 11-1 is configured to be provided with n antenna elements 11-1x which are first antenna elements having a vertical polarization characteristic, and n antenna elements 11-1y which are second antenna elements having a horizontal polarization characteristic, antenna elements 11-1x and 11-1y being provided for mobile terminals 20-1~20-n, respectively.

Antenna 11-2 is configured to be similarly provided with n antenna elements 11-2x which are third antenna elements having the vertical polarization characteristic and n antenna elements 11-2y which are fourth antenna elements having the horizontal polarization characteristic.

Each of mobile terminals 20-1~20-n is provided with antenna 21 configured by one antenna element having the vertical polarization characteristic.

Mobile communication is basically achieved by over-the-horizon communication in which no direct wave is propagated but the waves are reflected by obstructions such as buildings, etc. in the course of the propagation path, so that polarized waves that have been reflected and rotated are propagated.

Therefore, for example, both of polarized waves transmitted from mobile terminals 20-1 and 20-2 are vertical polarized waves when they are transmitted, but they are converted to different polarizations when they are received by base station 10.

In FIG. 1, for example, when base station 10 performs radio communication with mobile terminal 20-1, a received signal from mobile terminal 20-1 is a desired signal. On the other hand, a received signal from mobile terminal 20-3 existing in a direction different from the direction of the desired signal and a received signal from mobile terminal 20-2 existing in the same direction as the desired signal are interfering signals.

Figure 2:
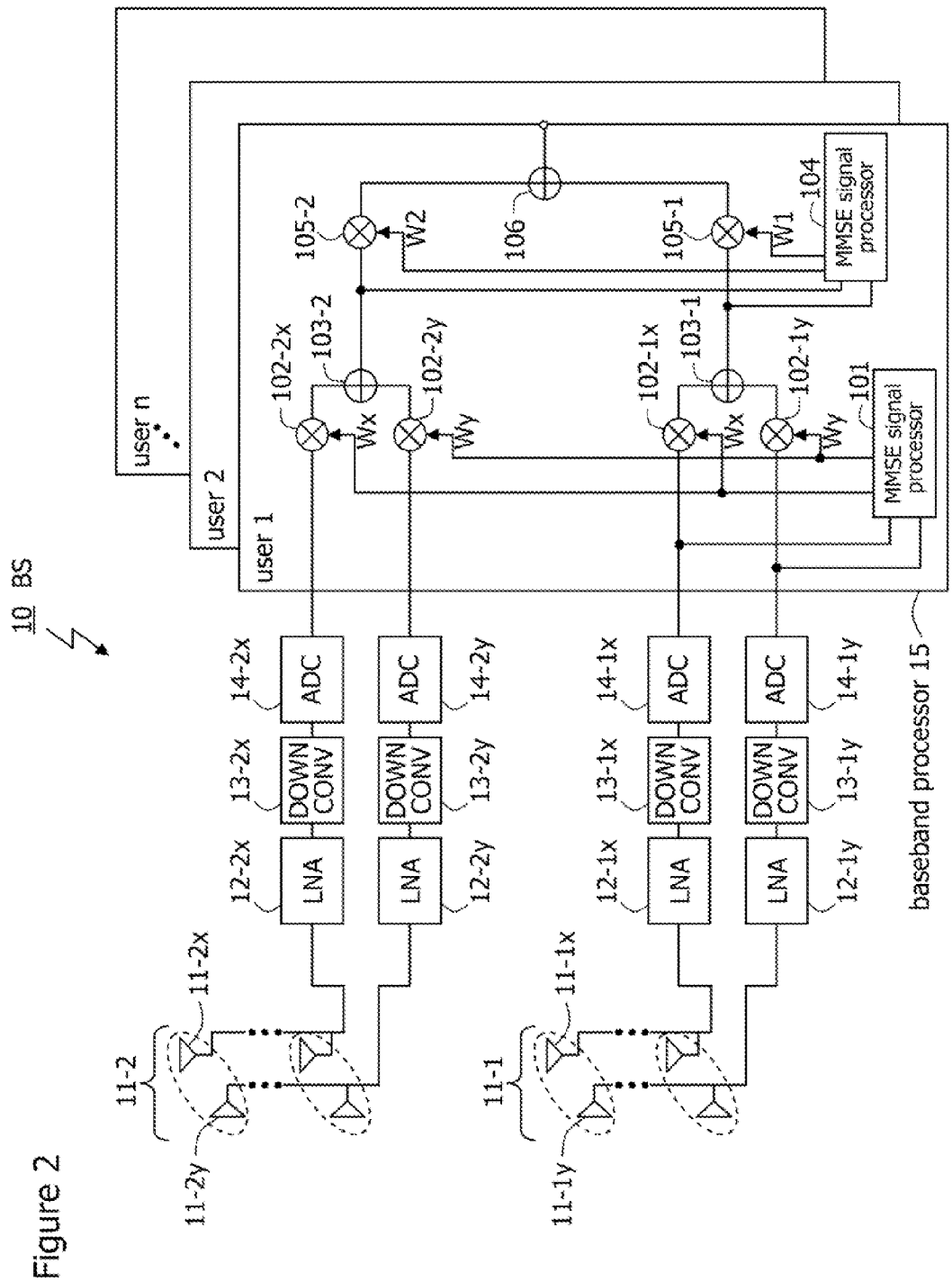
FIG. 2 is a block diagram showing the configuration of a base station of the first exemplary embodiment.

FIG. 2 is a diagram showing base station 10 of this exemplary embodiment.

As shown in FIG. 2, base station 10 of this exemplary embodiment has antenna 11-1 constituted by n antenna elements 11-1x and n antenna elements 11-1y provided for mobile terminals 20-1~20-n, respectively; antenna 11-2 constituted by n antenna elements 11-2x and n antenna elements 11-2y provided for mobile terminals 20-1~20-n, respectively; low noise amplifiers (LNAs) 12-1x, 12-1y, 12-2x and 12-2y; down converters 13-1x, 13-1y, 13-2x and 13-2y; A/D converters (ADCs: Analog Digital Converters) 14-1x, 14-1y, 14-2x and 14-2y; and n baseband processors 15 provided for mobile terminals 20-1~20-n, respectively.

Antenna elements 11-1x, 11-1y, 11-2x and 11-2y and baseband processors 15 operate independently from the polarizations of antennas 21 of their corresponding mobile terminals 20-1~20-n.

Baseband processor 15 has MMSE (Minimum Mean Square Error) signal processors 101 and 104, multipliers 102-1x, 102-1y, 102-2x, 102-2y, 105-1 and 105-2, and adders 103-1, 103-2 and 106.

Low noise amplifier 12-1x, down converter 13-1x and A/D converter 14-1x constitute a first baseband signal converter which converts a received signal received by antenna element 11-1x to a baseband signal.

Specifically, in the first baseband signal converter, a baseband signal is generated and outputted by low noise amplifier 12-1x amplifying a received signal received by antenna element 11-1x, down converter 13-1x down-converting the received signal outputted from low noise amplifier 12-1x to a baseband, and A/D converter 14-1x performing A/D conversion of the signal outputted from down converter 13-1x.

Low noise amplifier 12-1y, down converter 13-1y and A/D converter 14-1y constitute a second baseband signal converter which converts a received signal received by antenna element 11-1y to a baseband signal.

Low noise amplifier 12-2x, down converter 13-2x and A/D converter 14-2x constitute a third baseband signal converter which converts a received signal received by antenna element 11-2x to a baseband signal.

Low noise amplifier 12-2y, down converter 13-2y and A/D converter 14-2y constitute a fourth baseband signal converter which converts a received signal received by antenna element 11-2y to a baseband signal.

Since the operations of the second, third and fourth baseband signal converters are almost similar to the operation of the first baseband signal converter, description thereof will be omitted.

Multipliers 102-1x and 102-1y, and adder 103-1 constitute a first antenna combining unit.

Specifically, in the first antenna combining unit, multiplier 102-1x weights a baseband signal outputted from A/D converter 14-1x by multiplying the baseband signal by a weight coefficient Wx calculated by MMSE signal processor 101. Multiplier 102-1y weights a baseband signal outputted from A/D converter 14-1y by multiplying the baseband signal by a weight coefficient Wy calculated by MMSE signal processor 101. Adder 103-1 adds the weighted the baseband signals outputted from multipliers 102-1x and 102-1y to each other and outputs the result.

Multipliers 102-2x and 102-2y, and adder 103-2 constitute a second antenna combining unit.

Specifically, in the second antenna combining unit, multiplier 102-2x weights a baseband signal outputted from A/D converter 14-2x by multiplying the baseband signal by the weight coefficient Wx calculated by MMSE signal processor 101. Multiplier 102-2y weights a baseband signal outputted from A/D converter 14-2y by multiplying the baseband H) signal by the weight coefficient Wy calculated by MMSE signal processor 101. Adder 103-2 adds the weighted baseband signals outputted from multipliers 102-2x and 102-2y to each other and outputs the result.

MMSE signal processor 101 is a first signal processor which performs signal processing by MMSE, with output signals of A/D converters 14-1x and 14-1y at the time when a pilot signal is received by antenna elements 11-1x and 11-1y as a reference. MMSE signal processor 101 calculates the weight coefficients Wx and Wy by this signal processing by MMSE and outputs the weight coefficient Wx to multipliers 102-1x and 102-2x, and the weight coefficient Wy to multipliers 102-1y and 102-2y.

Specifically, MMSE signal processor 101 calculates, by the signal processing by MMSE, such weight coefficients Wx and Wy that a combined polarization of the received signals received by the antenna elements in antenna 11-1 and 11-2 are orthogonal to a polarization of an interfering signal existing in the same direction as a desired signal and that the signal level of signals outputted from adders 103-1 and 103-2 is maximized.

Multipliers 105-1 and 105-2, and adder 106 constitute a third antenna combining unit.

Specifically, in the third antenna combining unit, multiplier 105-1 weights a baseband signal outputted from adder 103-1 by multiplying the baseband signal by a weight coefficient W1 calculated by MMSE signal processor 104. Multiplier 105-2 weights a baseband signal outputted from adder 103-2 by multiplying the baseband signal by a weight coefficient W2 calculated by MMSE signal processor 104. Adder 106 adds the weighted baseband signals outputted from multipliers 105-1 and 105-2 to each other and outputs the result.

MMSE signal processor 104 is a second signal processor which performs signal processing by MMSE, with output signals of adders 103-1 and 103-2 at the time when a pilot signal is received by antenna elements 11-1x and 11-1y as a reference. MMSE signal processor 104 calculates the weight coefficients W1 and W2 by this signal processing by MMSE and outputs the weight coefficient W1 to multiplier 105-1 and the weight coefficient W2 to multiplier 105-2.

Specifically, MMSE signal processor 104 calculates, by the signal processing by MMSE, such weight coefficients W1 and W2 that a null is formed in a direction which is different from the direction of a desired signal and in which an interfering signal exists, in directivity patterns of antennas 11-1 and 11-2.

An already-known method can be used for the signal processing by MMSE performed at MMSE signal processors 101 and 104, and the method is not limited. Therefore, description thereof will be omitted.

An interference cancellation method by base station 10 will be described below with reference to FIG. 3.

Figure 3:
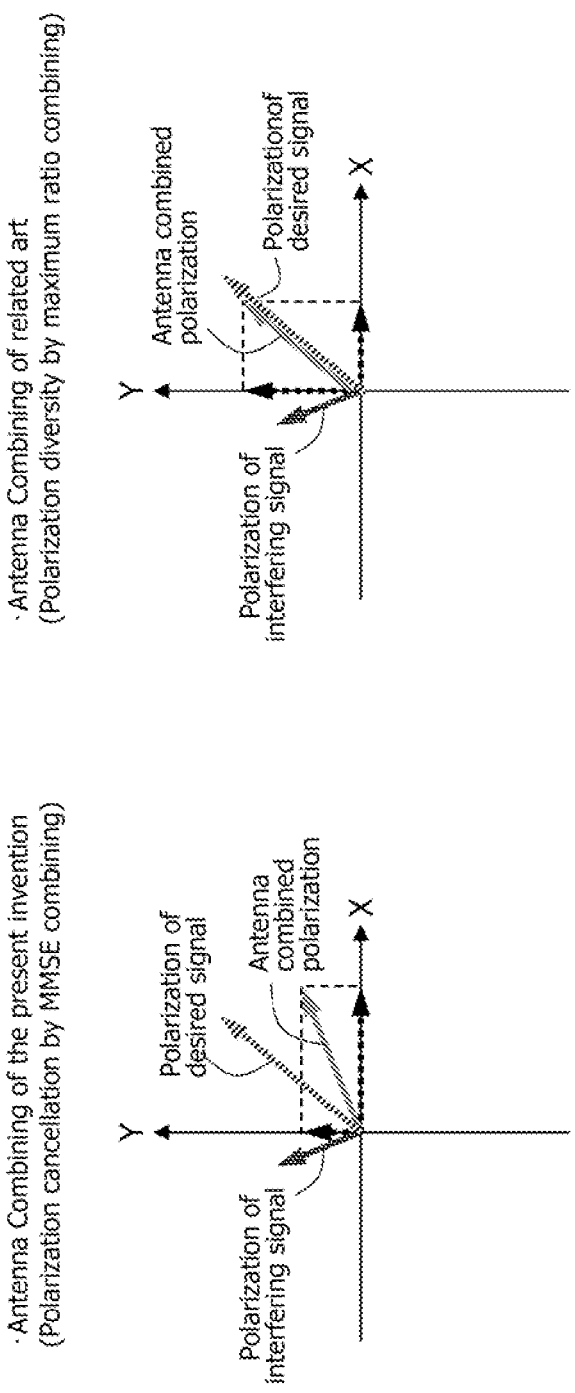
FIG. 3 is a diagram for explaining an antenna combining operation by a base station shown in FIG. 2.

FIG. 3 is a vector diagram for explaining an antenna combining operation performed at base station 10 for interference cancellation. In FIG. 3, the antenna combining operation by base station 10 of the present invention is shown on the left side, and a related-art antenna combining operation is shown on the right side for comparison.

As shown in FIG. 3, in the related art; maximum ratio combining (MRC: Maximum Ratio Combining) that combines the received signals at individual antenna elements in phase so as to maximize the signal level of the desired signal in conformity with the desired signal, is performed.

That is, in the related art, processing for maximizing the SNR (Signal to Noise. Ratio) is performed, and an interfering signal is cancelled thereby.

However, in the case where an interfering signal exists in the same direction as a desired signal, the interfering signal is also received, and thereby the quality of reception deteriorates.

On the other hand, in the present invention, base station 10 performs antenna combination first in which received signals of the antenna elements in antennas 11-1 and 11-2 are combined so that a combined polarization of the received signals of the antenna elements are orthogonal to a polarization of an interfering signal existing in the same direction as a desired signal, in antennas 11-1 and 11-2.

Thus, since such an interfering signal that is orthogonal to a combined polarization of the received signals of antenna elements cannot be received, it is possible to cancel an interfering signal existing in the same direction as a desired signal.

In this case, however, it is feared that the quality of reception deteriorates. Therefore, base station 10 performs antenna combination so that a combined polarization of the received signals of the antenna elements in antennas 11-1 and 11-2 is orthogonal to the polarization of the interfering signal existing in the same direction as the desired signal and that the SINR (Signal to Interference and Noise Power Ratio) of signals outputted from adders 103-1 and 103-2 is maximized.

That is, in the present invention, base station 10 performs processing for maximizing the SINR in the first antenna combination. Thereby, the quality of reception is enhanced while an interfering signal is cancelled.

Furthermore, in the present invention, base station 10 performs antenna combination for combining received signals of each of antennas 11-1 and 11-2 so that a null is formed in a direction which is different from the desired signal and in which an interfering signal exists, in the directivity patterns of antennas 11-1 and 11-2, after the first antenna combination (not shown in FIG. 3).

Therefore, since the receiving sensitivity deteriorates in the direction which is different from the direction of the desired signal and in which the interfering signal exists due to the formation of the null, the interfering signal existing in the direction different from the direction of the desired signal can be cancelled.

As described above, in this exemplary embodiment, base station 10 performs antenna combination for causing a combined polarization of the received signals of the antenna elements in antennas 11-1 and 11-2 to be orthogonal to a polarization of an interfering signal existing in the same direction as a desired signal first, and then performs antenna combination for controlling the directivity of antennas 11-1 and 11-2 so that a null is formed in a direction which is different from the direction of the desired signal and in which an interfering signal exists, by MMSE.

Therefore, as for an interfering signal existing in the same direction as a desired signal, base station 10 can cancel it by causing its polarization to be orthogonal to a combined polarization so that the interfering signal cannot be received. At the same time, as for an interfering signal existing in a direction different from the direction of the desired signal, base station 10 can cancel it by forming a null in that direction.

In the case of a configuration in which base station 10 not only causes a combined polarization of the received signals of the antenna elements in antennas 11-1 and 11-2 to be orthogonal to a polarization of an interfering signal existing in the same direction as a desired signal by MMSE but also maximizes the SINR of signals outputted from adders 103-1 and 103-2 by MMSE, it is possible to enhance the quality of reception while canceling the interfering signal existing in the same direction as the desired signal.

Second Exemplary Embodiment

Base station 10 in the first exemplary embodiment described above cancels an interfering signal existing in the same direction as a desired signal by a polarization in the first antenna combination and cancels an interfering signal existing in a direction different from the direction of the desired signal by directivity in the subsequent antenna combination.

On the contrary, base station 10 of this exemplary embodiment cancels an interfering signal existing in a direction different from the direction of a desired signal by directivity in the first antenna combination and cancels an interfering signal existing in the same direction as the desired signal by a polarization.

Figure 4:
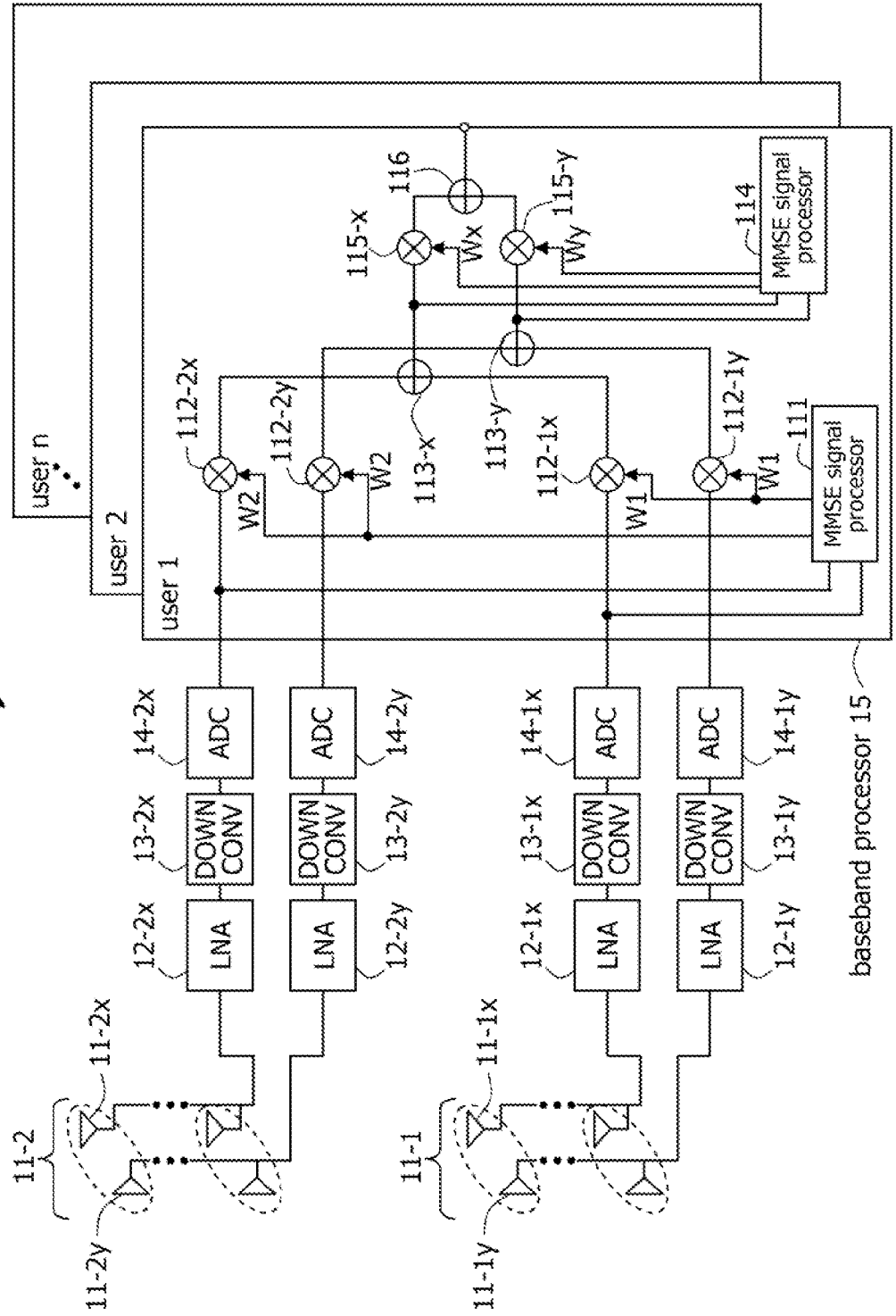
FIG. 4 is a block diagram showing the configuration of a base station of the second exemplary embodiment.

FIG. 4 is a block diagram showing the configuration of base station 10 of the second exemplary embodiment.

As shown in FIG. 4, base station 10 of this exemplary embodiment is different from the first exemplary embodiment shown in FIG. 2 only in the configuration of baseband processor 15. Therefore, only the configuration of baseband processor 15 will be described below.

Baseband processor 15 of this exemplary embodiment has MMSE signal processors 111 and 114, multipliers 112-1$x$, 112-1$y$, 112-2$x$, 112-2$y$, 115-$x$ and 115-$y$, and adders 113-$x$, 113-$y$ and 116.

Multipliers 112-1$x$ and 112-2$x$, and adder 113-$x$ constitute a first antenna combining unit.

Specifically, in the first antenna combining unit, multiplier 112-1$x$ weights a baseband signal outputted from A/D converter 14-1$x$ by multiplying the baseband signal by a weight coefficient W1 calculated by MMSE signal processor 111. Multiplier 112-2$x$ weights a baseband signal outputted from A/D converter 14-2$x$ by multiplying the baseband signal by a weight coefficient W2 calculated by MMSE signal processor 111. Adder 113-$x$ adds the weighted baseband signals outputted from multipliers 112-1$x$ and 112-2$x$ to each other and outputs the result.

Multipliers 112-1$y$ and 112-2$y$, and adder 113-$y$ constitute a second antenna combining unit.

Specifically, in the second antenna combining unit, multiplier 112-1$y$ weights a baseband signal outputted from A/D converter 14-1$y$ by multiplying the baseband signal by the weight coefficient W1 calculated by MMSE signal processor 111. Multiplier 112-2$y$ weights a baseband signal outputted from A/D converter 14-2$y$ by multiplying the baseband signal by the weight coefficient W2 calculated by MMSE signal processor 111. Adder 113-$y$ adds the weighted baseband signals outputted from multipliers 112-1$y$ and 112-2$y$ to each other and outputs the result.

MMSE signal processor 111 is a first signal processor which performs signal processing by MMSE, with output signals of A/D converter 14-1$x$ and 14-1$y$ at the time when a pilot signal is received by antenna elements 11-1$x$ and 11-1$y$ as a reference. MMSE signal processor 111 calculates the weight coefficients W1 and W2 by this signal processing by MMSE and outputs the weight coefficient W1 to multipliers 112-1$x$ and 112-1$y$ and the weight coefficient W2 to multiplier 112-2$x$ and 112-2$y$.

Specifically, MMSE signal processor 111 calculates, by the signal processing by MMSE, such weight coefficients W1 and W2 that a null is formed in a direction which is different from the direction of a desired signal and in which an interfering signal exists, in directivity patterns of antennas 11-1 and 11-2.

Multipliers 115-x and 115-y, and adder 116 constitute a third antenna combining unit.

Specifically, in the third antenna combining unit, multiplier 115-x weights a baseband signal outputted from adder 113-x by multiplying the baseband signal by a weight coefficient Wx calculated by MMSE signal processor 114. Multiplier 115-y weights a baseband signal outputted from adder 113-y by multiplying the baseband signal by a weight coefficient Wy calculated by MMSE signal processor 114. Adder 116 adds the weighted baseband signals outputted from multipliers 115-x and 115-y to each other and outputs the result.

MMSE signal processor 114 is a second signal processor which performs signal processing by MMSE, with output signals of adders 113-x and 113-y at the time when a pilot signal is received by antenna elements 11-1x and 11-1y as a reference. MMSE signal processor 114 calculates the weight coefficients Wx and Wy by this signal processing by MMSE and outputs the weight coefficient Wx to multiplier 115-x and the weight coefficient Wy to multiplier 115-y, respectively.

Specifically, MMSE signal processor 114 calculates, by the signal processing by MMSE, such weight coefficients Wx and Wy that a combined polarization of the received signals received by the antenna elements in antenna 11-1 and 11-2 are orthogonal to a polarization of an interfering signal existing in the same direction as a desired signal and that the signal level of signals outputted from adder 116 is maximized.

An already-known method can be used for the signal processing by MMSE performed at MMSE signal processors 111 and 114, and the method is not limited. Therefore, description thereof will be omitted.

As described above, in this exemplary embodiment, base station 10 performs antenna combination first for controlling the directivity of antennas 11-1 and 11-2 so that a null is formed in a direction which is different from the direction of a desired signal and in which an interfering signal exists, and then performs antenna combination for causing a combined polarization of the received signals of the antenna elements in antennas 11-1 and 11-2 to be orthogonal to a polarization of an interfering signal existing in the same direction as the desired signal, by MMSE.

Thus, compared with the first exemplary embodiment, the order of the antenna combination is merely changed in this exemplary embodiment, and therefore, an advantage similar to that of the first exemplary embodiment can be obtained.

The present invention has been described with reference to exemplary embodiments. However, the present invention is not limited to the exemplary embodiments described above. Various modifications understandable to one skilled in the art can be made in the configuration and details of the present invention within the scope of the present invention.

For example, in the first and second exemplary embodiments described above, description has been made with the case where two orthogonal polarized antennas are used as an example. However, the present invention is not limited thereto and is applicable to the case where three or more orthogonal polarized antennas are used.

The invention claimed is:

1. A mobile communication system configured to comprise a mobile terminal and a base station which performs radio communication with the mobile terminal, wherein
the base station comprises: a first antenna including a first antenna element having a first polarization characteristic and a second antenna element having a second polarization characteristic orthogonal to the first polarization characteristic;
a second antenna including a third antenna element having the first polarization characteristic and a fourth antenna element having the second polarization characteristic;
first to fourth baseband signal converters which convert received signals received by the first to fourth antenna elements to baseband signals, respectively;
a first antenna combining unit which weights the baseband signals converted by the first and second baseband signal converters by multiplying the baseband signals by first and second weight coefficients, respectively, and adds the weighted baseband signals to one another;
a second antenna combining unit which weights the baseband signals converted by the third and fourth baseband signal converters by multiplying the baseband signals by the first and second weight coefficients, respectively, and adds the weighted baseband signals to one another;
a third antenna combining unit which weights the baseband signals added by the first and second antenna combining units by multiplying the baseband signals by third and fourth weight coefficients, respectively, adds the weighted baseband signals to one another and outputs the result;
a first signal processor which calculates, as the first and second weight coefficients, such first and second weight coefficients that the combined polarization of the received signals received by the antenna elements in the first and second antennas, respectively, are orthogonal to a polarization of an interfering signal existing in the same direction as a desired signal, by MMSE (Minimum Mean Square Error) using an already-known pilot signal, wherein the interference signal can be removed even if the interference signal exists in the same direction as a desired signal; and
a second signal processor which calculates, as the third and fourth weight coefficients, such third and fourth weight coefficients that a null is formed in a direction different from the direction of the desired signal in directivity patterns of the first and second antennas and in which an interfering signal exists, by MMSE using an already-known pilot signal.

2. The mobile communication system according to claim 1, wherein the first signal processor calculates such first and second weight coefficients that the combined polarization of the received signals received by the antenna elements in the first and second antennas, respectively, are orthogonal to the polarization of the interfering signal existing in the same direction as the desired signal, and the SINR (Signal to Interference and Noise Power Ratio) of signals outputted from the first and second adders are maximized, by MMSE using an already-known pilot signal.

3. The mobile communication system according to claim 1, wherein the first to fourth antenna elements, the first to third antenna combining units, and the first and second signal processors are provided for each mobile terminal.

4. The mobile communication system according to claim 3, wherein the first to fourth antenna elements, the first to third antenna combining units, and the first and second signal processors operate independently from a polarization of an antenna of the mobile terminal.

5. A base station which performs radio communication with a mobile terminal, comprising:
a first antenna including a first antenna element having a first polarization characteristic and a second antenna element having a second polarization characteristic orthogonal to the first polarization characteristic;

a second antenna including a third antenna element having the first polarization characteristic and a fourth antenna element having the second polarization characteristic;

first to fourth baseband signal converters which convert received signals received by the first to fourth antenna elements to baseband signals, respectively;

a first antenna combining unit which weights the baseband signals converted by the first and second baseband signal converters by multiplying the baseband signals by first and second weight coefficients, respectively, and adds the weighted baseband signals to one another;

a second antenna combining unit which weights the baseband signals converted by the third and fourth baseband signal converters by multiplying the baseband signals by the first and second weight coefficients, respectively, and adds the weighted baseband signals to one another;

a third antenna combining unit which weights the baseband signals added by the first and second antenna combining units by multiplying the baseband signals by third and fourth weight coefficients, respectively, adds the weighted baseband signals to one another and outputs the result;

a first signal processor which calculates, as the first and second weight coefficients, such first and second weight coefficients that the combined polarization of the received signals received by the antenna elements in the first and second antennas, respectively, are orthogonal to a polarization of an interfering signal existing in the same direction as a desired signal, by MMSE using an already-known pilot signal, wherein the interference signal can be removed even if the interference signal exists in the same direction as a desired signal; and a second signal processor which calculates, as the third and fourth weight coefficients, such third and fourth weight coefficients that a null is formed in a direction different from the direction of the desired signal in directivity patterns of the first and second antennas and in which an interfering signal exists, by MMSE using an already-known pilot signal.

6. The base station according to claim 5, wherein the first signal processor calculates such first and second weight coefficients that the combined polarization of the received signals received by the antenna elements in the first and second antennas, respectively, are orthogonal to the polarization of the interfering signal existing in the same direction as the desired signal, and the SINR of signals outputted from the first and second adders are maximized, by MMSE using an already-known pilot signal.

7. The base station according to claim 5, wherein the first to fourth antenna elements, the first to third antenna combining units, and the first and second signal processors are provided for each mobile terminal.

8. The base station according to claim 7, wherein the first to fourth antenna elements, the first to third antenna combining units, and the first and second signal processors operate independently from a polarization of an antenna of the mobile terminal.

9. An interference cancellation method performed by a base station which performs radio communication with a mobile terminal, the method comprising:

first and second conversion steps of converting received signals received by first and second antenna elements of a first antenna to baseband signals, respectively, the first antenna element having a first polarization characteristic and the second antenna element having a second polarization characteristic orthogonal to the first polarization characteristic;

third and fourth conversion steps of converting received signals received by third and fourth antenna elements of a second antenna to baseband signals, respectively, the third antenna element having the first polarization characteristic and the fourth antenna element having the second polarization characteristic;

a first antenna combining step of weighting the baseband signals converted at the first and second conversion steps by multiplying the baseband signals by first and second weight coefficients, respectively, and adding the weighted baseband signals to one another;

a second antenna combining step of weighting the baseband signals converted at the third and fourth conversion steps by multiplying the baseband signals by the first and second weight coefficients, respectively, and adding the weighted baseband signals to one another;

a third antenna combining step of weighting the baseband signals added at the first and second antenna combining steps by multiplying the baseband signals by third and fourth weight coefficients, respectively, adding the weighted baseband signals to one another and outputting the result;

a first calculation step of calculating, as the first and second weight coefficients, such first and second weight coefficients that the combined polarization of the received signals received by the antenna elements in the first and second antennas, respectively, are orthogonal to a polarization of an interfering signal existing in the same direction as a desired signal, by MMSE using an already-known pilot signal, wherein the interference signal can be removed even if the interference signal exists in the same direction as a desired signal; and a second calculation step of calculating, as the third and fourth weight coefficients, such third and fourth weight coefficients that a null is formed in a direction different from the direction of the desired signal in directivity patterns of the first and second antennas and in which an interfering signal exists, by MMSE using an already-known pilot signal.

10. The interference cancellation method according to claim 9, wherein, at the first calculation step, such first and second weight coefficients are calculated that the combined polarization of the received signals received by the antenna elements in the first and second antennas, respectively, are orthogonal to the polarization of the interfering signal existing in the same direction as the desired signal, and the SINR of signals outputted from the first and second adders are maximized, by MMSE using an already-known pilot signal.

* * * * *